(12) United States Patent
Iwakini

(10) Patent No.: US 6,483,452 B1
(45) Date of Patent: Nov. 19, 2002

(54) RADAR DETECTING APPARATUS

(75) Inventor: Mikio Iwakini, Tokyo (JP)

(73) Assignee: Uniden Corporation, Tokyo (JP)

( * ) Notice: Subject to any disclaimer, the term of this patent is extended or adjusted under 35 U.S.C. 154(b) by 14 days.

(21) Appl. No.: 09/677,843

(22) Filed: Oct. 3, 2000

(30) Foreign Application Priority Data

Jun. 20, 2000 (JP) ...................................... 2000-185390

(51) Int. Cl.[7] ............................................. G01S 13/50
(52) U.S. Cl. ............................ 342/20; 342/70; 342/71; 342/72; 342/357.06; 342/357.08; 342/357.13; 342/454; 342/457
(58) Field of Search ............................. 342/20, 70, 71, 342/72, 357.06, 357.07, 357.08, 357.09, 357.1, 357.13, 453, 454, 456, 457, 461, 463

(56) References Cited

U.S. PATENT DOCUMENTS 4,906,999 A * 3/1990 Harrah et al. ................. 342/20
6,118,403 A * 9/2000 Lang ...................... 342/357.09
6,201,493 B1 * 3/2002 Silverman ..................... 342/20
6,204,798 B1 * 3/2002 Fleming, III ................. 342/20

* cited by examiner

Primary Examiner—John B. Sotomayor
(74) Attorney, Agent, or Firm—McDermott, Will & Emery

(57) ABSTRACT

The present invention provides a radar detecting apparatus that is able to entirely prevent the generation of false alarms due to jamming waves.

The radar detecting apparatus comprises a radar sensing portion and a GPS receiver displaying the current position of the automobile. While traveling, the radar detecting apparatus stores the locations, intensities, and so forth, of jamming waves, forms a jamming wave map, and creates a database of this information. The radar detecting apparatus refers to this database and suppresses the detection sensitivity of the radar sensing portion according to the intensity of the jamming waves when the automobile passes near jamming waves; this reduces false detection of radar waves. Also, the radar detecting apparatus calculates speed from the change in the position of the vehicle and prevents the output of an alarm by the radar detecting apparatus when the speed is at or below the speed limit of the currently traveled roadway.

16 Claims, 15 Drawing Sheets

FIG.7

| REGISTRATION NUMBER | LOCATION | SIGNAL INTENSITY | FREQUENCY BAND | COMMENTS |
|---|---|---|---|---|
| 1 | P1 | S1 | K | |
| 2 | P2 | S2 | K | |
| 3 | P3 | S2 | K | |
| 4 | P4 | S2 | K | |
| 5 | P5 | S1 | K | |
| 6 | P6 | S1 / S1 | X / K | |
| 7 | P7 | S1 / S1 | X / K | |
| 8 | P8 | S1 / S1 | X / K | |
| 9 | P9 | S1 / S1 | X / K | |
| 10 | P10 | S1 / S1 | X / K | |
| 11 | P11 | S2 | X | |
| 12 | P12 | S3 | X | |
| 13 | P13 | S3 | X | |
| 14 | P14 | S3 | X | |
| 15 | P15 | S2 | X | |
| 16 | P16 | S2 | X | |
| 17 | P17 | S1 | X | |
| 18 | P18 | S1 | X | |
| 19 | P19 | S1 | X | |
| 20 | P20 | S0 | | |
| 21 | P21 | S1 | K | |
| 22 | P22 | S1 | K | |
| 23 | P23 | S1 | K | |
| 24 | P24 | S0 | | |

FIG.9

| JAMMING WAVES | CENTRAL LOCATION | RANGE | LEVEL | FREQUENCY |
|---|---|---|---|---|
| 1 | O1 | I1 | 1 | K |
| 2 | O2 | I2 | 2 | K |
| 3 | O3 | I3 | 1 | X |
| 4 | O4 | I4 | 2 | X |
| 5 | O5 | I5 | 3 | X |
| 6 | O6 | I6 | 1 | Ka |
| ⋮ | ⋮ | ⋮ | ⋮ | ⋮ |

RADAR DETECTING APPARATUS

BACKGROUND OF THE INVENTION

1. Field of the Invention

The present invention relates to a radar detecting apparatus for invoking a driver's attention so that the movement speed of a moving body such as a vehicle does not exceed a stipulated speed, and more particularly to a radar detecting apparatus comprising a sensing wave detecting apparatus for detecting the presence of sensing waves and a position detecting apparatus for finding the current position of the moving body, such as a GPS (global positioning system), for example.

2. Description of the Related Art

The traveling speed of a vehicle is measured with a vehicle speed measuring apparatus (speed sensor), such as a portable "speed gun" or fixed radar (or laser) measuring apparatus. A radar receiver for detecting the sensing waves of such a speed measuring apparatus receives the X band (10.525 GHz), K band (24.150 GHz), and Ka band (33.4 to 36 GHz), for example. The received frequencies cover a very broad range of frequencies and are in the high frequency band. For this reason, the first stage of the radar receiver is a mixer; a preamp and band-pass filter are not established in the first stage portion. A receiver with such a constitution does not include a band-pass filter for each received band and is therefore easily affected by jamming waves.

For example, even with a lower frequency signal, higher harmonics are generated because of the non-linear characteristics of the mixer stage when a signal with an intense level enters the mixer stage. This becomes a signal frequency such as X, K, Ka bands and causes the radar receiver to generate a false alarm. In an urban area, radio waves are used for automatic door sensors, traffic signal control, and so forth. Also, radio waves are used in vehicle distance sensors on vehicles. For this reason, when a vehicle travels through an urban area, it is easy for the radar receiver to generate false alarms frequently. As a countermeasure for this, a "city mode" is established to reduce the sensitivity of the radar receiver, for example, but at the same time, this also reduces the capacity of the speed measuring apparatus to capture sensing waves.

SUMMARY OF THE INVENTION

Accordingly, it is an object of the present invention to provide a radar detecting apparatus that is able to prevent false alarms due to jamming waves.

Also, it is another object of the present invention to provide a radar detecting apparatus that is able to prevent false alarms by storing the frequencies, reception power, reception location, and so forth of jamming waves transmitted from a fixed location.

In order to achieve the abovementioned objects, the radar detecting apparatus relating to the present invention is a radar detecting apparatus that is installed in a vehicle and that captures sensing waves emitted by a speed sensor, further comprising a wireless receiving portion that searches the frequency bands in which the abovementioned sensing waves are present and generates signal information relating to the electromagnetic wave signals upon detecting electromagnetic wave signals corresponding to prescribed conditions; a travel position detecting portion for detecting the current position of the abovementioned vehicle and outputting the position information; first storage means for storing data; and a control portion for storing at least the abovementioned vehicle position information and the abovementioned signal information to the abovementioned storage apparatus.

The abovementioned travel position detecting portion preferably comprises a GPS receiving apparatus and outputs at least the latitude and longitude as the abovementioned vehicle position information. The abovementioned signal information preferably includes at least either the frequency or intensity of the detected electromagnetic signal.

Such a constitution makes possible the collection of data relating to jamming waves in the area in which an automobile is traveling.

Preferably, the abovementioned control portion references the plurality of signal information and position information data collected in the abovementioned first storage means, forms a map of the distribution of the electromagnetic wave signals in the area through which the abovementioned vehicle has traveled, and holds this map in the non-volatile second storage means. It thereby becomes possible to form a distribution map of jamming waves and to use this as a database. Moreover, the first and second storage means may be constituted with one storage apparatus. It is also possible to form such a database for each region and provide the database on an information storage medium such as a CD-ROM, DVD-ROM, or memory card. The database mentioned above, may also be provided online, for example, via a network medium such as the Internet or public telecommunications lines.

The abovementioned distribution map of electromagnetic wave signals preferably displays the area in which the abovementioned electromagnetic wave signals are present as a contour group that can be distinguished by the intensity and frequency of the signals. With the so-called contour representation, an area is classified by the intensity and frequency of the signal, making this representation easy to use.

The abovementioned storage means preferably store the abovementioned contour group according to the central position of the area represented by the contour and the distance from the central position to the contour. Storing information in such a format makes it possible to reduce the quantity of information stored (data compression).

In order to achieve the abovementioned objects, the radar detecting apparatus relating to the present invention is a radar detecting apparatus that is installed in a vehicle and that captures sensing waves emitted by a speed sensor, further comprising a wireless receiving portion that searches the frequency bands in which the abovementioned sensing waves are present and generates signal information relating to the electromagnetic wave signals upon detecting electromagnetic wave signals; a travel position detecting portion for detecting the current position of the abovementioned vehicle and outputting the position information; a storage portion wherein locations of jamming waves causing false detection by the abovementioned wireless receiving portion and jamming wave information relating to the jamming waves are stored in advance; warning means for generating warnings; and a control portion for comparing signal information of the abovementioned detected electromagnetic signal and the jamming wave information, corresponding to the current location of the abovementioned vehicle read from the abovementioned storage portion on the basis of the position information of the abovementioned vehicle, and controlling the abovementioned warning means on the basis of the results thereof.

Such a constitution makes it possible to reduce the number of false alarms by comparing signal information for jamming waves stored as above, corresponding to jamming waves located near the travel position, with the signal information of detected electromagnetic wave signals; determining whether the electromagnetic wave signal comprises sensing waves or jamming waves; and stopping the generation of a warning when the electromagnetic wave signal comprises jamming waves.

The radar detecting apparatus relating to the present invention is a radar detecting apparatus that is installed in a vehicle and that captures sensing waves emitted by a speed sensor, further comprising a wireless receiving portion that searches the frequency bands in which the abovementioned sensing waves are present and generates a detection signal upon detecting electromagnetic wave signals corresponding to a detection reference; a travel position detecting portion for detecting the current position of the abovementioned vehicle and outputting position information; a storage portion wherein locations of jamming waves causing false detection by the abovementioned wireless receiving portion and information relating to the jamming waves are stored in advance; warning means for generating warnings on the basis of the generation of the abovementioned detection signal; and a control portion for reading signal information when jamming waves are present in the vicinity of the position information of the abovementioned vehicle, and establishing (or updating, or changing) a detection reference for the abovementioned wireless receiving portion.

Such a constitution makes it possible to reduce the number of false alarms because of establishing detection reference for jamming waves, corresponding to jamming waves present near the travel position, and detecting sensing waves.

The radar detecting apparatus relating to the present invention is a radar detecting apparatus that is installed in a vehicle and that captures sensing waves emitted by a speed sensor, further comprising detecting means 100, 300 for searching the frequency bands in which the abovementioned sensing waves are present and generating detection signals upon detecting electromagnetic wave signals corresponding to prescribed conditions; travel position detecting means 200 for detecting the current position of the abovementioned vehicle and outputting position information; warning means 303, 304 for generating warnings on the basis of the generation of the abovementioned detection signal; storage means wherein the speed limit for the route traveled by the abovementioned vehicle is stored; and control means 300 for calculating the vehicle speed from the change in the abovementioned position information and the time difference and suppressing the output of the abovementioned detection signal when the vehicle speed does not exceed the abovementioned speed limit.

Such a constitution makes it possible to prevent the generation of unnecessary alarms when the speed limit is being maintained.

The radar detecting apparatus relating to the present invention is a radar detecting apparatus that is installed in a vehicle and that captures sensing waves emitted by a speed sensor, further comprising a wireless receiving portion that searches the frequency bands in which the abovementioned sensing waves are present and generates a detection signal upon detecting electromagnetic wave signals corresponding to a detection reference; a travel position detecting portion for detecting the current position of the abovementioned vehicle and outputting position information; a storage portion wherein locations of jamming waves causing false detection by the abovementioned wireless receiving portion and information relating to the jamming waves are stored in advance; warning means for generating warnings on the basis of the abovementioned detection signals; a storage portion wherein the speed limit for the route traveled by the abovementioned vehicle is stored; and a control portion for reading signal information when jamming waves are present in the vicinity of the position information of the abovementioned vehicle, comparing that signal information of the jamming waves to already stored signal information relating to electromagnetic wave signals, calculating vehicle speed from the change in the abovementioned position information and time difference, and suppressing the output of the abovementioned detection signal when the vehicle speed does not exceed the abovementioned speed limit.

With such a constitution, unnecessary alarms are not generated in the case where the speed limit on the route is being maintained, even if the generation of false alarms due to jamming waves on the travel route is suppressed while speed sensing waves are detected, and the presence of the sensing waves is detected.

The radar detecting apparatus relating to the present invention is a radar detecting apparatus that is installed in a vehicle and that captures sensing waves emitted by a speed sensor, further comprising a wireless receiving portion that searches the frequency bands in which the abovementioned sensing waves are present and generates a detection signal upon detecting electromagnetic wave signals corresponding to prescribed conditions; a travel position detecting portion for detecting the current position of the abovementioned vehicle and outputting position information; a storage portion for storing data; marker input means for generating a marker command signal in response to an operation; and a control portion for reading signal information in response to the generation of the abovementioned marker command signal, correlating the abovementioned marker command signal and the position information, and storing this correlation in the abovementioned storage portion.

Also, the radar detecting apparatus relating to the present invention is a radar detecting apparatus that is installed in a vehicle and that captures sensing waves emitted by a speed sensor, further comprising a wireless receiving portion that searches the frequency bands in which the abovementioned sensing waves are present and generates a detection signal upon detecting electromagnetic wave signals corresponding to prescribed conditions; a travel position detecting portion for detecting the current position of the abovementioned vehicle and outputting position information; warning means for generating warnings in response to the abovementioned detection signal; a storage portion for storing position information already correlated to a marker command signal; and a control portion for ordering a warning or the like from the abovementioned warning means or other signaling means, when the position information for the current position of the abovementioned vehicle matches or approaches the position information correlated with the abovementioned marker signal.

Such a constitution makes it possible to cause the radar detecting apparatus to generate a warning (or signal) at locations (points) in an area where attention should be paid. Moreover, the marker and position information may be input manually and in advance.

The abovementioned position information preferably includes latitude, longitude, and time. The abovementioned electromagnetic wave signals includes radio waves and laser beams and corresponds to speed sensors using radio waves and speed sensors using laser beams.

A database of information (position, field intensity, frequency, emission time, and so forth) on jamming waves along the vehicle travel route is formed for each region. This database is recorded on an information recording medium such as a CD-ROM, DVD-ROM, or MD (mini disk) or provided online, making it possible to reduce the learning load as the vehicle is actually traveling.

BRIEF DESCRIPTION OF THE DRAWINGS

FIG. 7 is a drawing to explain an example of sampling data collected in the jamming wave learning mode;

FIG. 9 is a drawing to explain an example of compressed data;

DESCRIPTION OF THE PREFERRED EMBODIMENTS

The preferred embodiments of the present invention are explained below with reference to the drawings.

Figure 1:
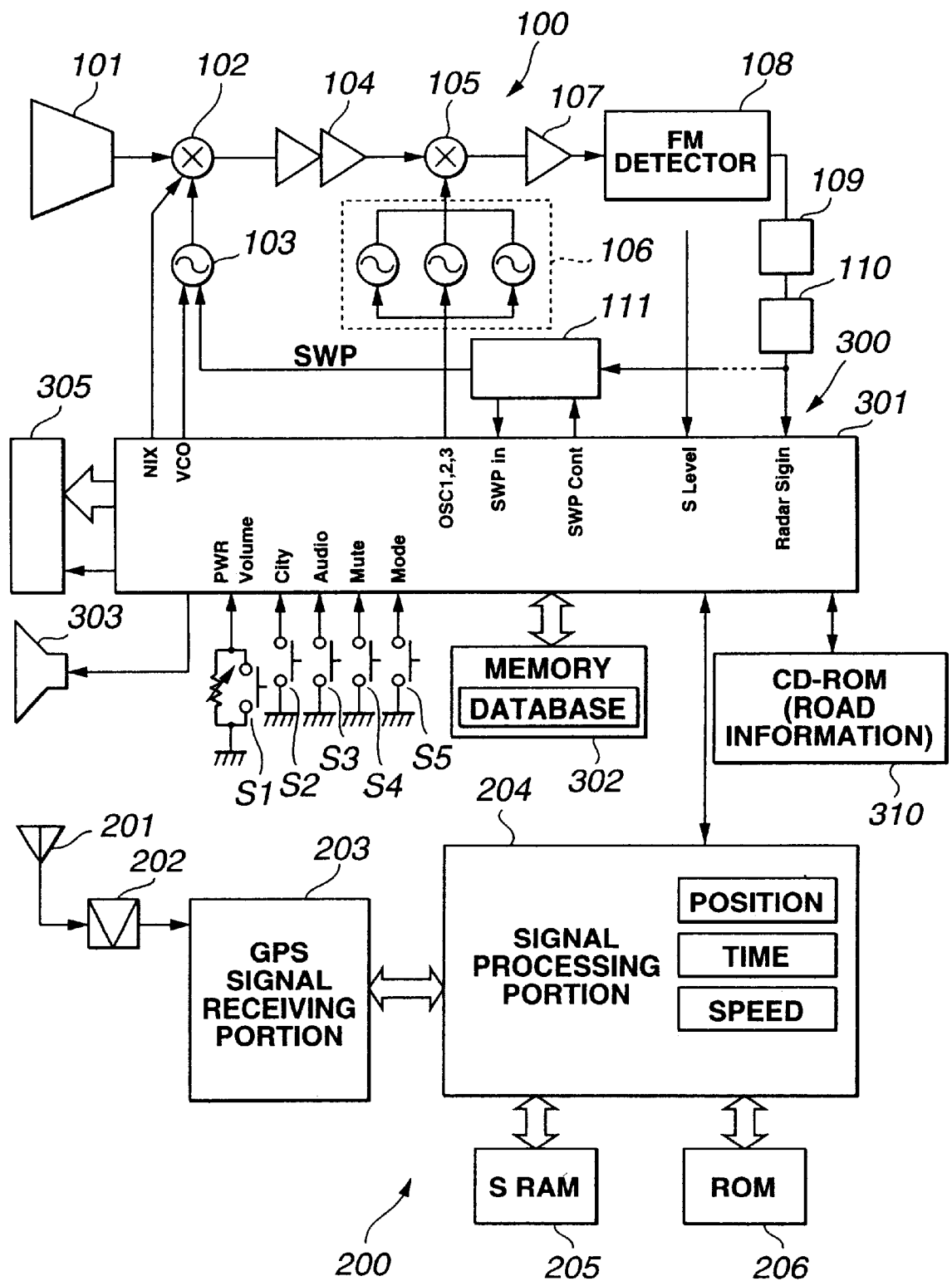
FIG. 1 is a block diagram for explaining an embodiment of the radar detecting apparatus relating to the present invention and comprising a GPS receiving function.

FIG. 1 shows an example of a GPS radar detecting apparatus relating to the present invention. This apparatus basically comprises a wireless receiving portion 100 for detecting sensing waves, a GPS receiver 200 for distinguishing the position of the automobile, and a control portion 300 for controlling these apparatuses and so forth and determining whether to generate alarms.

The wireless receiving apparatus 100 comprises: a horn antenna 101 for capturing incoming radio waves; a first mixer 102 for converting high frequency signals induced by the horn antenna to a first intermediate frequency signal; a first local oscillator (VCO) 103 for supplying a local transmitting signal (local signal) of a frequency corresponding to the control voltage in the mixer 102; a first intermediate frequency amplifier 104 for amplifying the first intermediate frequency signal; a second mixer 105 for converting the amplified first intermediate frequency signal to a second intermediate frequency signal; a second local oscillator 106 for supplying a local signal corresponding to the reception band (X, K, Ka bands) to the mixer 105 in response to the second local control signal; a second intermediate amplifier 107 for amplifying the second intermediate frequency signal; an FM detector 108 for FM (frequency modulation) detection of the second intermediate frequency signal and outputting the detection output and carrier level (S (signal) level); a waveform shaper 109 for waveform shaping of the detection output; a pulse noise remover (low pass filter) 110 for removing noise that does not satisfy the prescribed pulse amplitude from the pulse-shaped output from the waveform shaper 109 and supplying this signal to the control portion 300; a sweep oscillator 111 for applying a sweep voltage (sawtooth wave) to the first local oscillator 103 in order for searching sensing waves; and so forth. This sweep voltage is also supplied to the control portion 300. Moreover, besides the constitution for searching reception bands in response to the frequency sweep as discussed above, the wireless receiving portion 100 may also have a constitution using a synthesizer tuner with which it is possible to set reception frequencies arbitrarily.

The GPS receiver measures the position P (latitude x, longitude y, height z) of the vehicle and the time with the GPS system. At least four satellites are selected for this measurement. Usually eight to twelve satellites are selected in order for high precision positioning in a short period of time. The GPS receiver sequentially generates the C/A code assigned to each satellite received while correlating this code to the received signal from each satellite. The C/A code is a pseudonoise (PN) code; peaks are detected when the code correlation is made. After the signal is captured, the GPS receiver effects tracking of the carrier phase and code phase, and calculates the time $t_i$ from the receiver reference time. The product of this time $t_i$ and the wave propagation speed c becomes the pseudo distance $r_i$ (=$ct_i$). This process is carried out for four satellite signals. The equation for positioning the receiver position (x, y, z) from the i-th satellite position (known $X_i$, $Y_i$, $Z_i$) is expressed as below.

$$r_i = ((x-X_i)^2 + (y-Y_i)^2 + (z-Z_i)^2)^{1/2} + \text{error } S$$

It becomes possible to measure the receiver position P (x, y, z) by running the abovementioned equation for four satellites.

The GPS receiver 200 comprises an antenna 201 for receiving the GPS signal that is frequency diffused with the PN codes from the GPS satellites; a preamp 202 for amplifying the signal induced by the antenna; a signal receiving portion 203 which generates the PN codes and comprises a circuit (correlator) for comparing and tracking the received signal and code phase; a signal processing portion 204 for position calculation processing for calculating the position, speed, and time of the GPS receiver discussed above;

S-RAM 205 for effecting data storage; ROM 206 for storing programs; and so forth. The signal processing portion 204 is constituted of a digital signal processor and microcontroller. The receiver position, vehicle speed, and time are supplied from the signal processing portion 204 via a serial port to the control portion 300.

The GPS receiver 200 may also be a GPS receiver used in a driving navigation apparatus (navigation system) that includes a map database and provides guidance by showing the path traveled by the vehicle on a road map displayed on a screen. A driving navigation apparatus using a position determining method other than a GPS system, such as inertial navigation, may also be used.

The control portion 300 comprises a microcontroller 301 wherein a CPU, ROM, RAM, input/output interface, and so forth are combined in a single device. The control portion also comprises a memory 302 with a large storage capacity, such as flash memory, and a CD-ROM apparatus 310 for reading information from a CD-ROM whereon is recorded a database of road map (route) information, traffic control information (speed limits, for example), and the like. Switches S1 to S5, with which a user inputs commands, are established in the microcontroller 301. The power on/off command and the volume of the warning buzzer or speaker are set with the volume switch S1. The city mode, for raising the sensing wave discrimination reference, is turned on and off with the switch S2. The alarm is set to buzzer or voice with the switch S3. The alarm output (voice) is muted with the switch S4. The operating modes of the radar receiver, such as normal mode, learning mode, and jamming wave removal mode, are selected with the switch S5. The operating status of the apparatus is displayed with a plurality of LEDs 304. Also, information-is displayed with an eight column equivalent dot matrix display 305.

Figure 2:
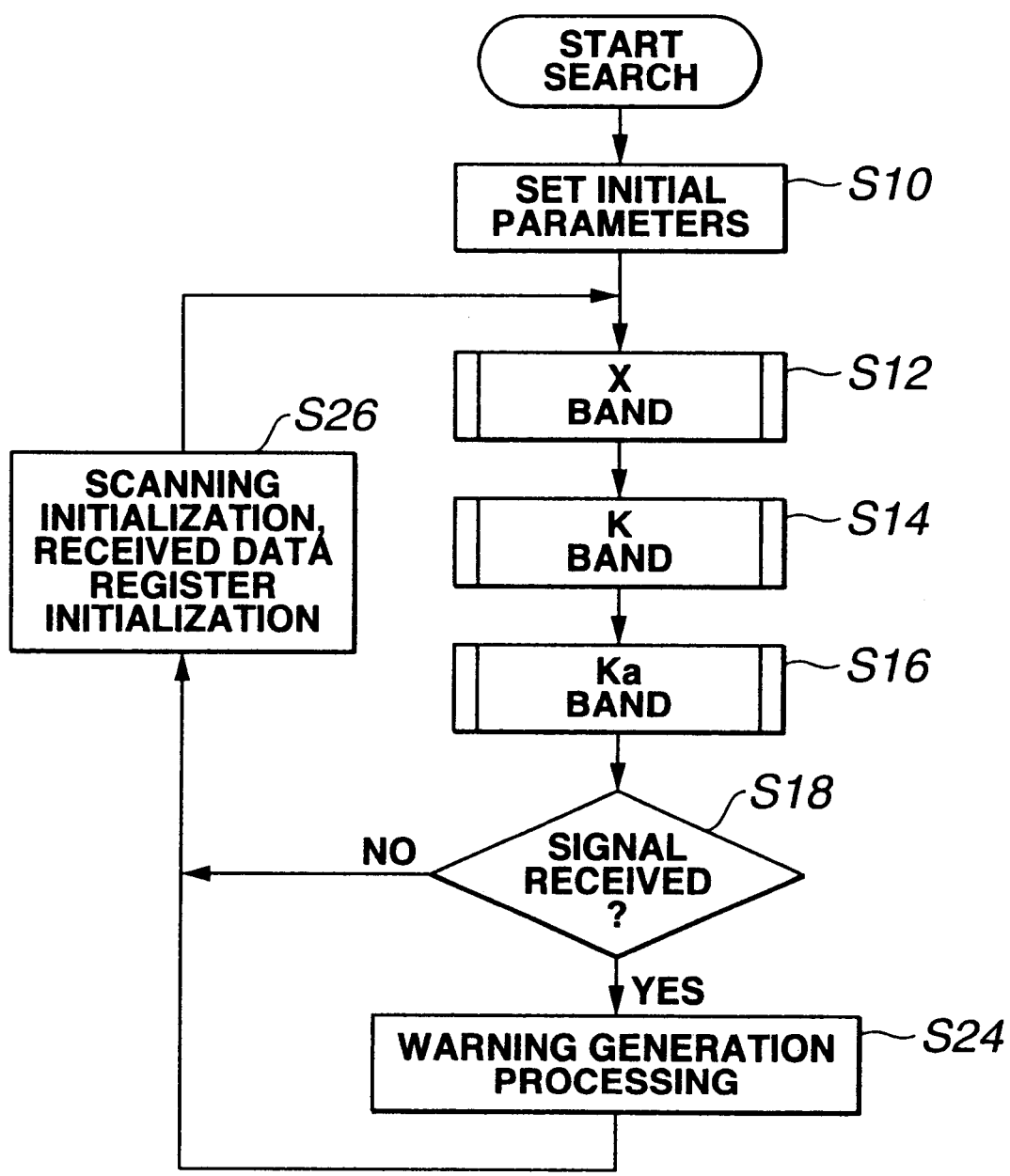
FIG. 2 is a flowchart for explaining an operation for searching three bands.

The basic detecting operation of the radar detecting apparatus is explained next with reference to FIGS. 2 and 3.

When the power switch (PWR) S1 of the apparatus is turned ON, power is supplied to each portion and initialization, wherein the flag register, each received data register, and the memory class are set to prescribed values, is performed (S10). When the operating mode for effecting radar sensing is set with the mode selection switch S5 or the like, the control portion 300 commences operations and effects search processing for radar sensing waves in the X band (S12), search processing for radar sensing waves in the K band (S14), and search processing for radar sensing waves in the Ka Band (S16), in that order, as shown in FIG. 2. A received data register (X register, K register, Ka register) is prepared for each band and sensing wave information is recorded to the register of a band when sensing waves are detected in that searched band.

Figure 3:
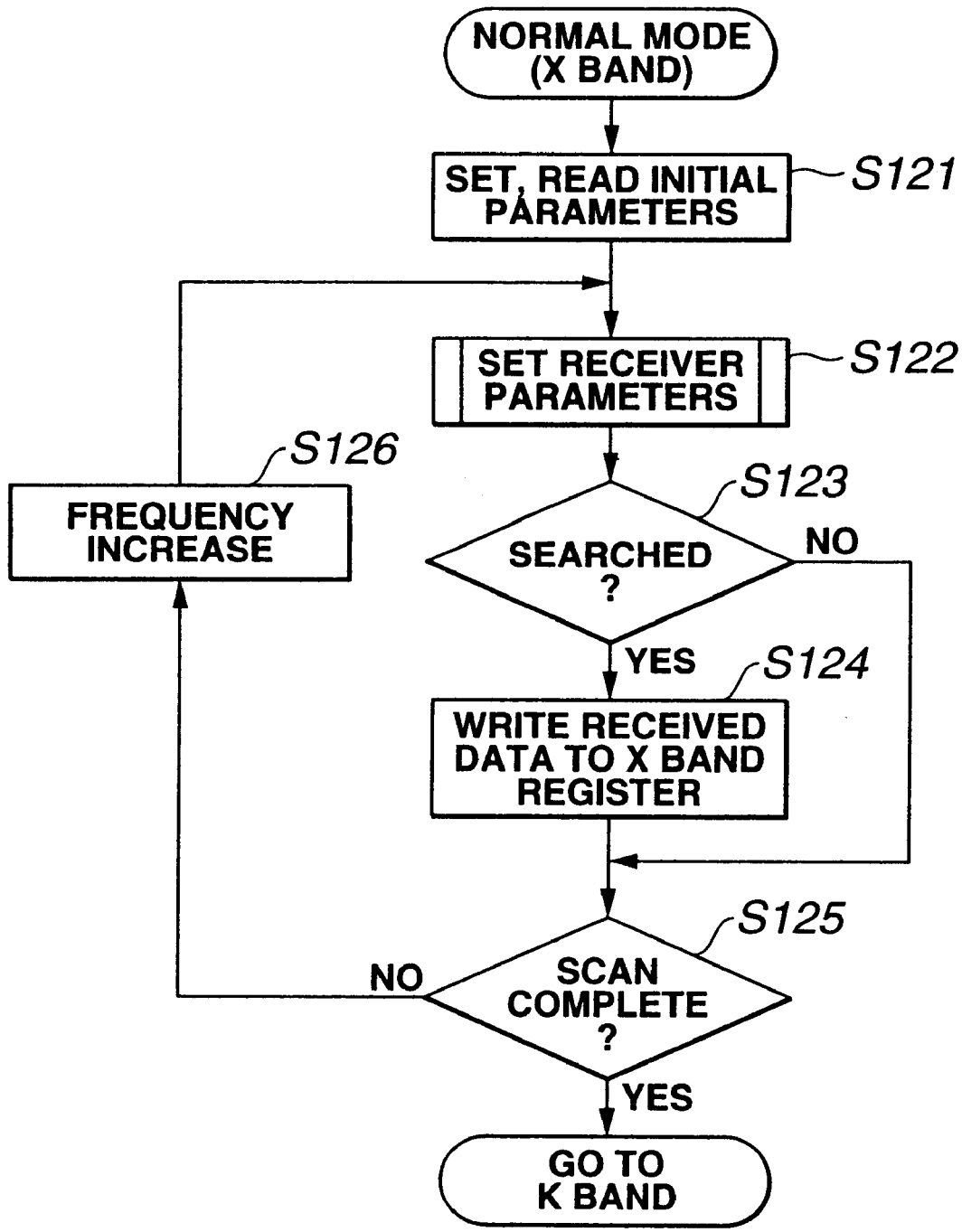
FIG. 3 is a flowchart for explaining the detection of radar sensing waves in the X band.

FIG. 3 is a flow chart for explaining the X band search processing (S12). When X band processing begins, the control portion 300 sets parameters for the receiving portion 100 for setting the received frequency of the receiving portion to the starting frequency of the X band.

The control portion 300 reads the initial X band parameters for setting the receiving portion 100 from the data base in the memory 302 (S121).

On the basis of the parameters, the control portion 300 provides a second local control signal, causing output of a local signal corresponding to the X band, to the second local oscillator 106 and causes oscillation at 1.31 GHz. The control portion provides a sweep control signal to the sweep oscillator 111, causes the generation of sweep voltage, and causes the first local oscillator 103 to oscillate at 11.2 (to 12 GHz). Also, the control portion 300 provides a VCO adjusting voltage, for adjusting the shifted portion of the frequency of each band, to the first local oscillator 103. The control portion 300 monitors the sweep voltage (SWP in) supplied to the first local oscillator 103 and can find the currently received (searched) frequency by referring to a table (X band) of sweep voltages versus received frequencies previously stored in a database. The incoming radio waves in the X band are converted to a 1.3 GHz first intermediate frequency signal, converted to a 0.01 GHz (10 MHz) second intermediate frequency signal by the second mixer 105, to which the second 1.31 GHz local signal is supplied, and pulse demodulated by the FM detector 108 (S122).

The pulse signal demodulated by the FM detector 108 is supplied to the control portion 300 via a noise filter 110 and a determination of whether the incoming waves are sensing waves for speed measurement is made. The FM detector 108 supplies the level (S level) of the carrier signal to the control portion 300.

The control portion 300 determines whether the received pulse signal displays the characteristics of the sensing waves or whether the received level exceeds the prescribed level established as the detection reference (S123). When it is thereby determined that sensing waves are present (S123: Yes), the control portion writes received data such as the frequency and signal level to the X band register (S124). After writing, and when it is determined that sensing waves are not present (S123: No), the control portion determines whether X band scanning is terminated according to the sweep voltage value, for example (S125). In the case when scanning is not yet terminated (S125: No), the control portion provides a sweep control signal, to raise the received frequency by Δf (corresponding to the frequency resolution), to the sweep oscillator 111 (S126). The sweep voltage increases by ΔV and causes an increase in the received frequency of the receiver (S122). Moreover, the frequency of the local portion oscillator 103 may be increased by self-propulsion. Then steps S122 through S125 inclusive are repeated in the same manner and the X band is scanned. When the sweep voltage (number of sweeps) exceeds a prescribed value and the scan of the X band is ended (S125: Yes), the process moves on to the next K band search processing.

When the same search processing is effected for the K band and Ka band and sensing waves are present, received information is written to the K register and Ka register respectively.

Moreover, the K band search is effected in the same way as the X band search (S12) discussed above, but the reception parameters have the second local signal set to 1.06 GHz. The incoming radio waves in the K band are mixed with the double harmonic component ((11.5 to 11.6 GHz)×2) of the first local signal by the first mixer 102 to become a 1.05 GHz first intermediate frequency signal and converted to a 0.01 GHz second intermediate frequency signal by the second mixer. The control portion 300 monitors the sweep voltage (SWP in) supplied to the first local oscillator 103 and can discern the currently received (sensed) frequency by referring to a previously stored table (K band) of sweep voltages versus received frequencies.

Likewise, the Ka band search has the second local signal set to 0.61 GHz. The incoming radio waves in the Ka band are mixed with a triple harmonic component ((11.33 to 11.8 GHz)×3) of the first local signal by the first mixer 102 to become a 0.6 GHz first intermediate frequency signal, and converted to a 0.01 GHz second intermediate frequency signal by the second mixer. The control portion 300 monitors the sweep voltage (SWP in) supplied to the first local oscillator 103 and can discern the currently received (sensed) frequency by referring to a previously stored table (Ka band) of sweep voltages versus received frequencies.

Returning to FIG. 2, the control portion 300 distinguishes whether the information on the sensing waves is written to the data register for each band (S18). When the presence of sensing waves is indicated (S18: Yes), a warning is generated by the warning sound of the speaker 303 and the LED display 305 (S124). This warning is canceled after the passage of a prescribed time (3 seconds, for example) or by operation of the reset switch. When sensing wave information is not written to the register (S18: No) or when the warning (S24) is generated, the received data register is initialized, the parameters are initialized (S26), and the search is repeated in order from the X band (S12 to S24). The search for radar detecting waves during travel is effected in this manner.

Next the learning mode for collecting jamming wave data is explained with reference to FIGS. 4 and 5. In these figures, the same symbols are applied to portions corresponding to FIGS. 2 and 3 and an explanation of those portions is omitted.

The learning mode is an operating mode wherein the vehicle travels while measuring radio waves in the X, K, and Ka bands, and stores locations where jamming waves are present, and the field intensity, signal frequency, time, and so forth thereof. The stored data are made into a database and referenced to distinguish jamming waves and sensing waves in the supporting travel mode, discussed below.

Figure 4:
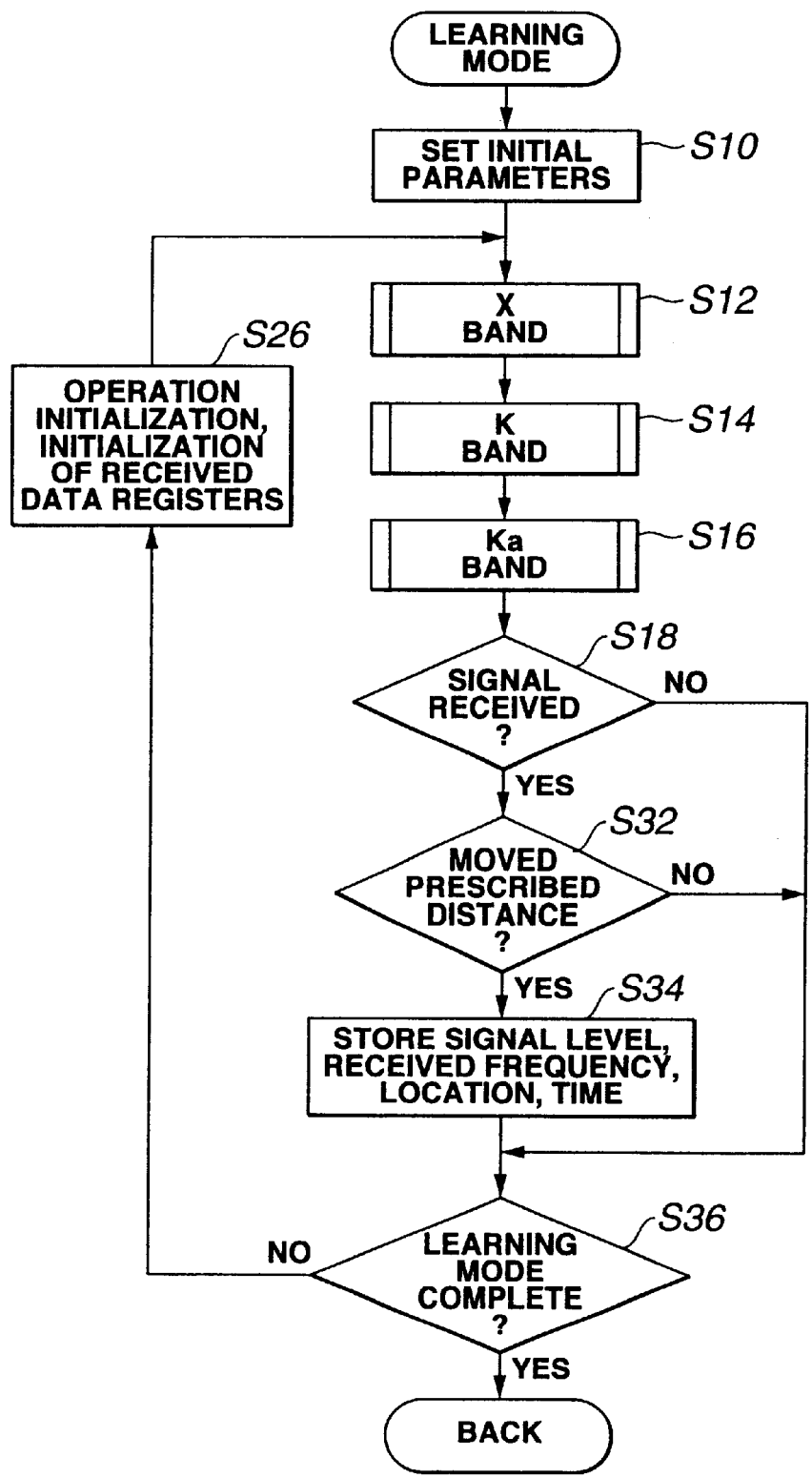
FIG. 4 is a flowchart for explaining the learning mode.

FIG. 4 is a flowchart for explaining the learning mode. When a user operates the mode selection switch S5, the learning mode flag is set and learning mode execution is ordered by the control portion 300. The control portion 300 initializes the registers and so forth (S10) and performs X band search processing (S12), K band search processing (S14), and Ka Band search processing (S16) in that order. When jamming waves are detected in a band, the control portion 300 writes information relating to jamming waves to the received data register for that band.

Figure 5:
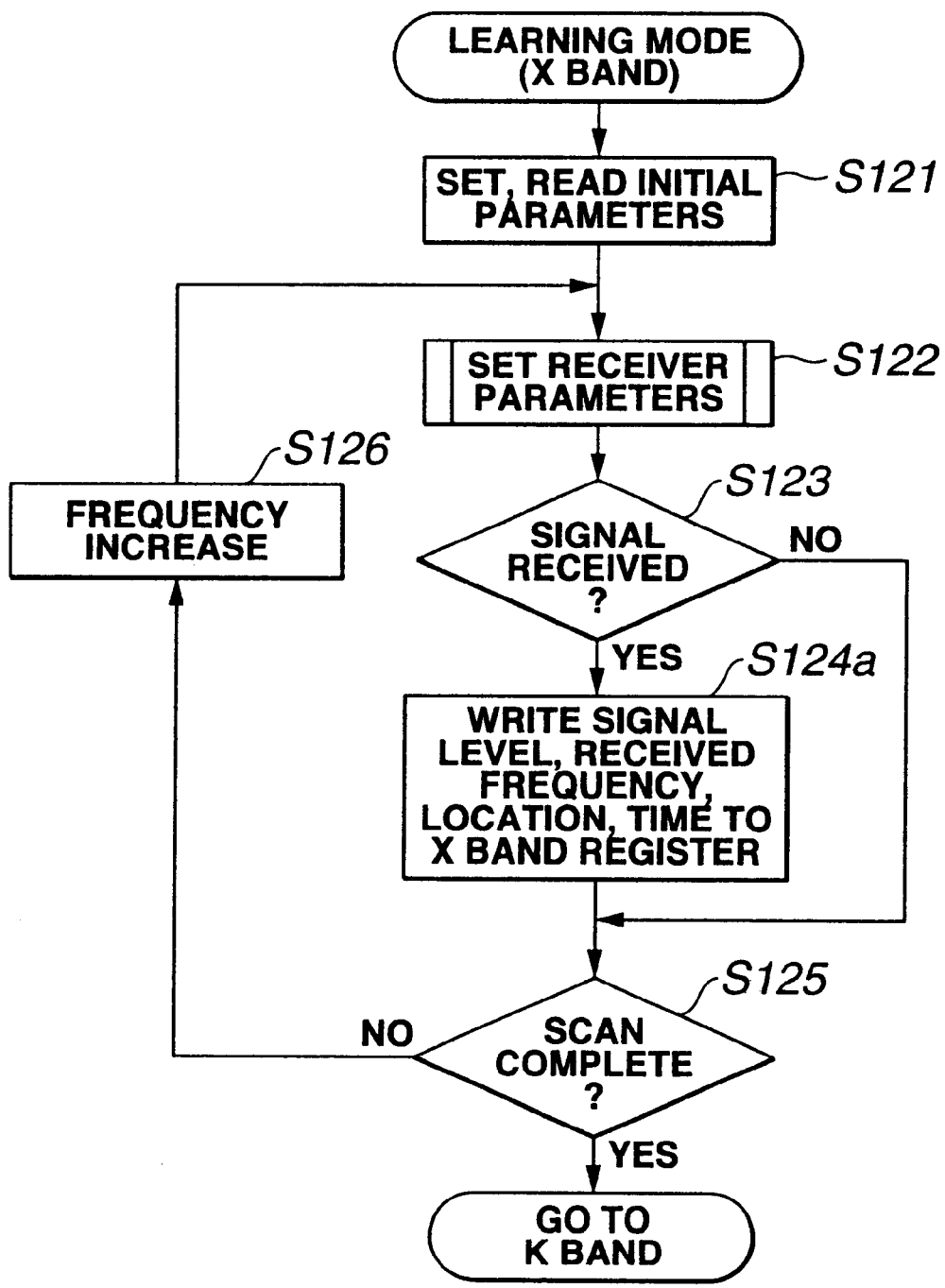
FIG. 5 is a flowchart for explaining data collection in the X band in learning mode.

FIG. 5 is a flowchart for explaining an example of the X band learning mode. The control portion 300 reads parameters for setting the initial X band frequency from the database in memory (S121) and sets the receiving portion 100 (S122). The control portion 300 distinguishes whether a signal was received on the set frequency according to the output of the receiving portion 100 (S123). When a signal is present (S123: Yes), the control portion 300 writes information relating to this received signal in the data register. The signal information includes the reception band, received frequency, signal intensity (S level), signal location (latitude, longitude), and time of reception (S124a). After writing to the register or when no signal is received (S123: No), the control portion 300 determines whether the X band search is complete (S125). When the search is not complete (S125: No), the searched frequency is increased by the frequency resolution $\Delta f$ (S126) and the signal search and register writing are repeated (S122 to S125). When the X band search is ended, the process moves to the K band search. The search is effected in the same way for the K band (S14) and Ka band (S16).

Returning to FIG. 4, the control portion 300 reads the data registers for the X band, K band, and Ka band and distinguishes whether signal information is written thereto (S18). In order to reduce data redundancy when information is written (S18: Yes), the control portion 300 determines whether the current position of the vehicle according to the output of the GPS receiver has moved a prescribed distance, such as 20 m from the previous position (S32: Yes). When the position has moved (S32: Yes), the control portion 300 reads the signal level, frequency, reception location, and time of reception of the received signal from the reception register of each band and writes this data to the memory 302 (S34). Next, the control portion 300 determines whether the learning mode is complete (S36). For example, when the vehicle arrives at the destination and the user operates the switch SW5, the learning mode flag is reset and the completion of the learning mode is commanded. When the learning mode is complete, the process returns to the main routine (S36: Yes).

Meanwhile, when signals are not received (S18: No), and when the vehicle has not traveled a prescribed distance (S32: No), it is confirmed that the learning mode is not complete (S36). When not complete (S36: No), the control portion 300 initializes the data register of each band (S26), repeats the search of the X band, K band, and Ka band (S12 to S16), and collects data for received signals at the vehicle position (S18, S34). In this way, data regarding signals, that are jamming signals in each band along the route traveled by the vehicle, are collected in memory 302. The collected signal data can be compressed and stored as discussed below.

Moreover, in the abovementioned example, the movement of a prescribed distance is used as a condition to prevent overcrowding of the gathered data. It is also allowable to confirm the vehicle position every second and search each band at that time, for example.

Figure 6:
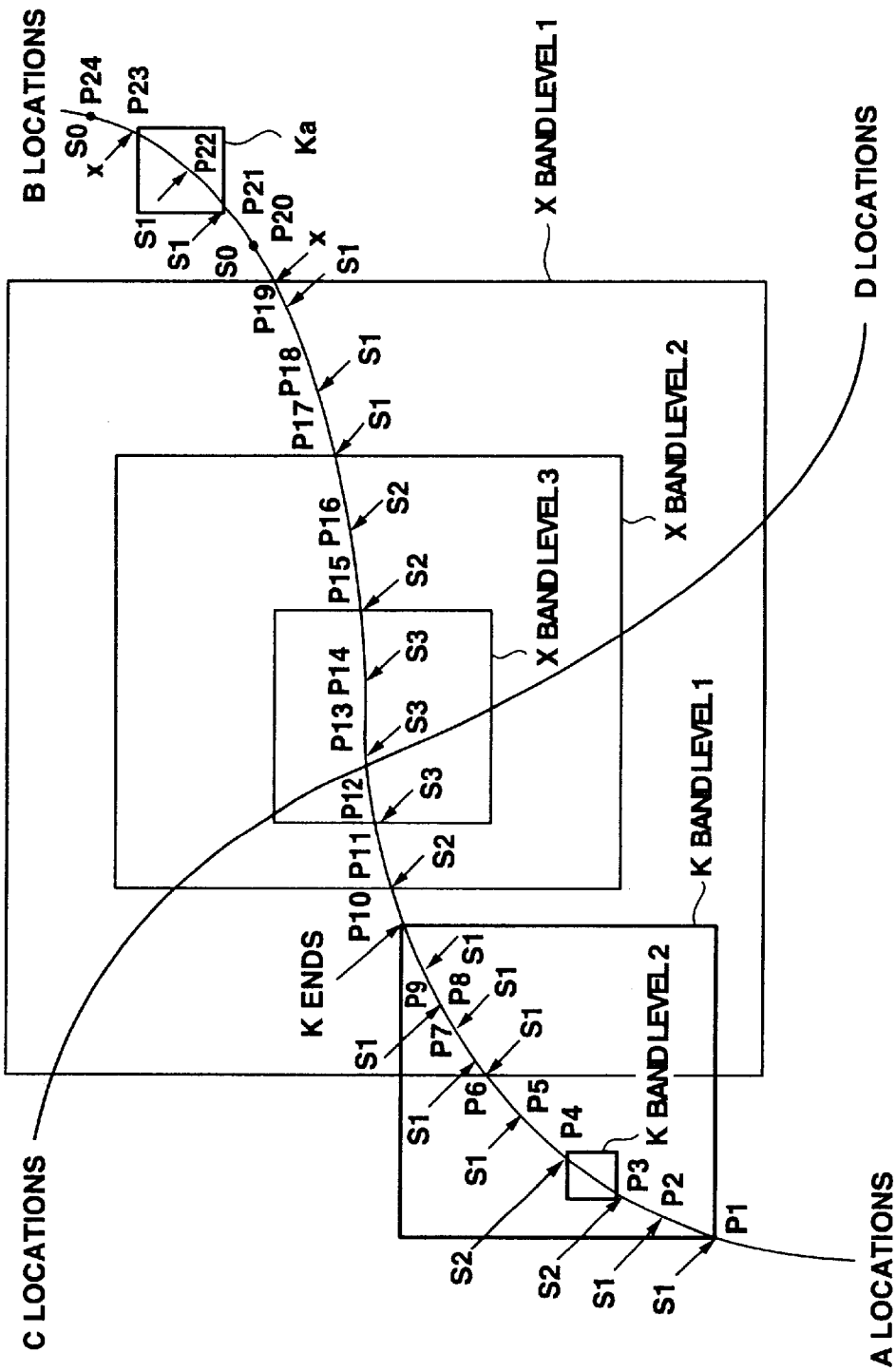
FIG. 6 is a drawing to explain learning mode along the vehicle route.

FIG. 6 is a drawing to explain the learning mode, discussed above, as illustrated by a vehicle traveling from location A to location B. FIG. 7 is a table for explaining the recording of the sampled data.

As shown in FIG. 6, the vehicle starts traveling from location A in the learning mode. The radar receiver cycles through the X, K, and Ka bands and monitors the presence of sensing waves (radio waves). When radio waves with a signal intensity S1 (level 1) in the K band frequency are received at point P1, at point P1 in the output of the GPS receiver (x1, y1, z1), the output of the receiving portion, signal intensity S1 and frequency K, and so forth are recorded in memory. When the vehicle moves to point P2 (x2, y2, z2) and detects the presence of a signal, the output of the receiving portion, the signal intensity S1 and frequency K, and so forth are recorded in memory. When the vehicle moves to point P3 (x3, y3, z3) and detects the presence of a signal, the point P3, the receiving portion output, the signal intensity S2 and frequency K, and so forth are recorded in memory. In the same way, the position, signal intensity, frequency, and so forth are measured and recorded at each point. At point P6, jamming waves are detected in both the X band and K band and the signal level S1/S1 and frequency of each are recorded. After passing point P10, the reception of jamming waves in the K band is complete, so that at point P11, jamming waves are detected at the signal level S2 in the X band only. At point P12, the signal level increases to S3. The level S3 of X band jamming waves is recorded. At point P15, the level of the X band jamming waves drops from S3 to S2. At point P17, the level of the X band jamming waves drops from S2 to S1. At point P19, the level of the X band jamming waves is S1, but at point P20, received jamming waves are not detected. At point P21, Ka band jamming waves are detected at level S1. At points P22 and P23, Ka band jamming waves are detected at level S1, but jamming waves are not detected at point P24.

Also, while not shown in the table in FIG. 7, the learning mode is executed along a travel route from location C toward location D and map data of the distribution of jamming wave intensities are formed as shown in FIG. 6.

Figure 8:
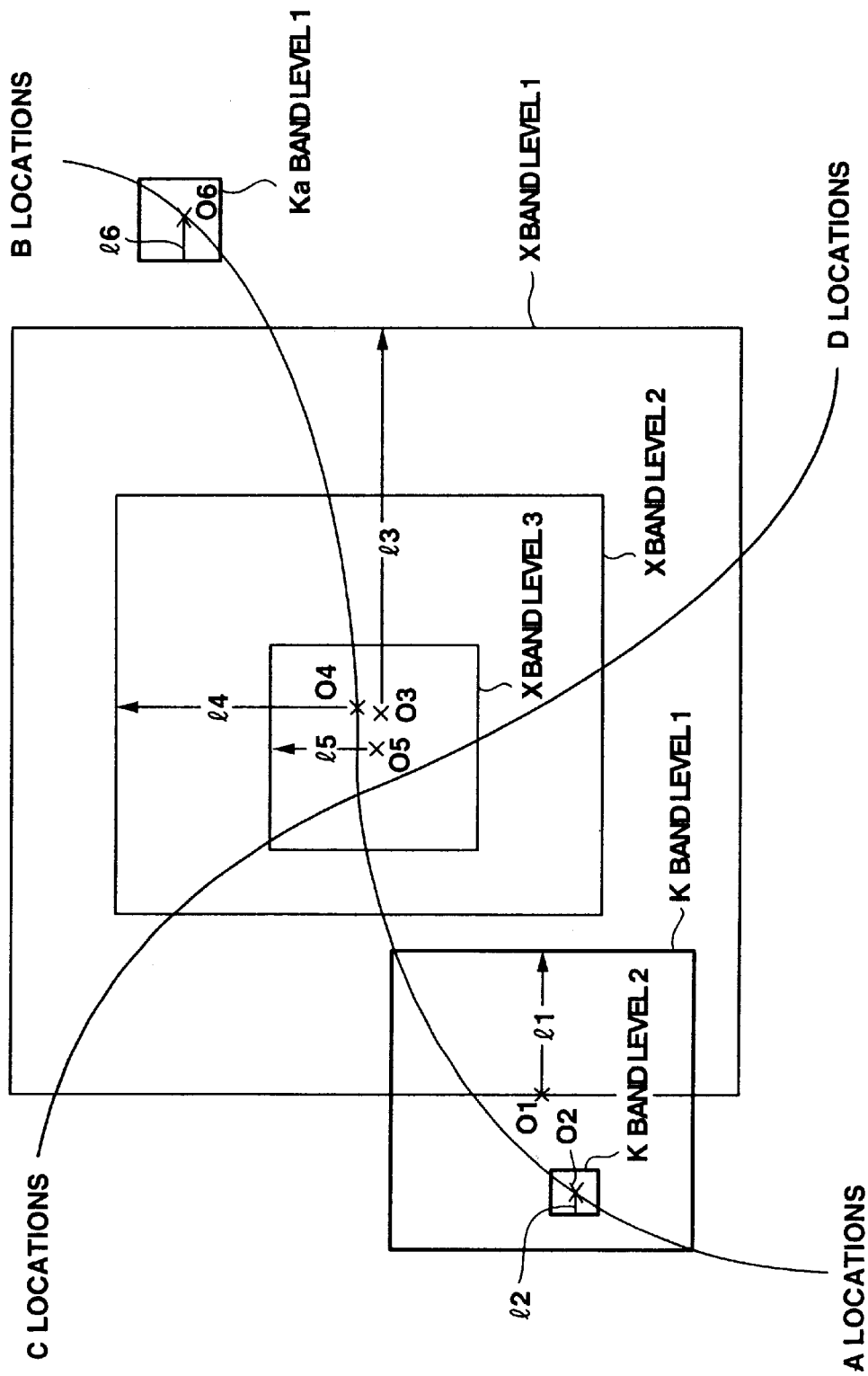
FIG. 8 is a drawing to explain an example of data compression of sampling data.

FIGS. 8 and 9 show examples of data compression of the map data (database) of jamming wave distribution. As shown in FIG. 6, the K band level 1 region, K band level 2 region, X band level 1 region, X band level 2 region, X band level 3 region, and Ka band level 1 region are found from the accumulated data.

As shown in FIG. 8, each jamming wave region is expressed as a contour such as a circle or polygon. For example, the regions are shown with squares in the example shown. The center On of each region and the distance in from the center to the edge (contour) of the region are stored in memory 302 as shown in FIG. 9. In this way, data are compressed and a jamming wave intensity distribution map is formed for the area traveled by the user.

Figure 10:
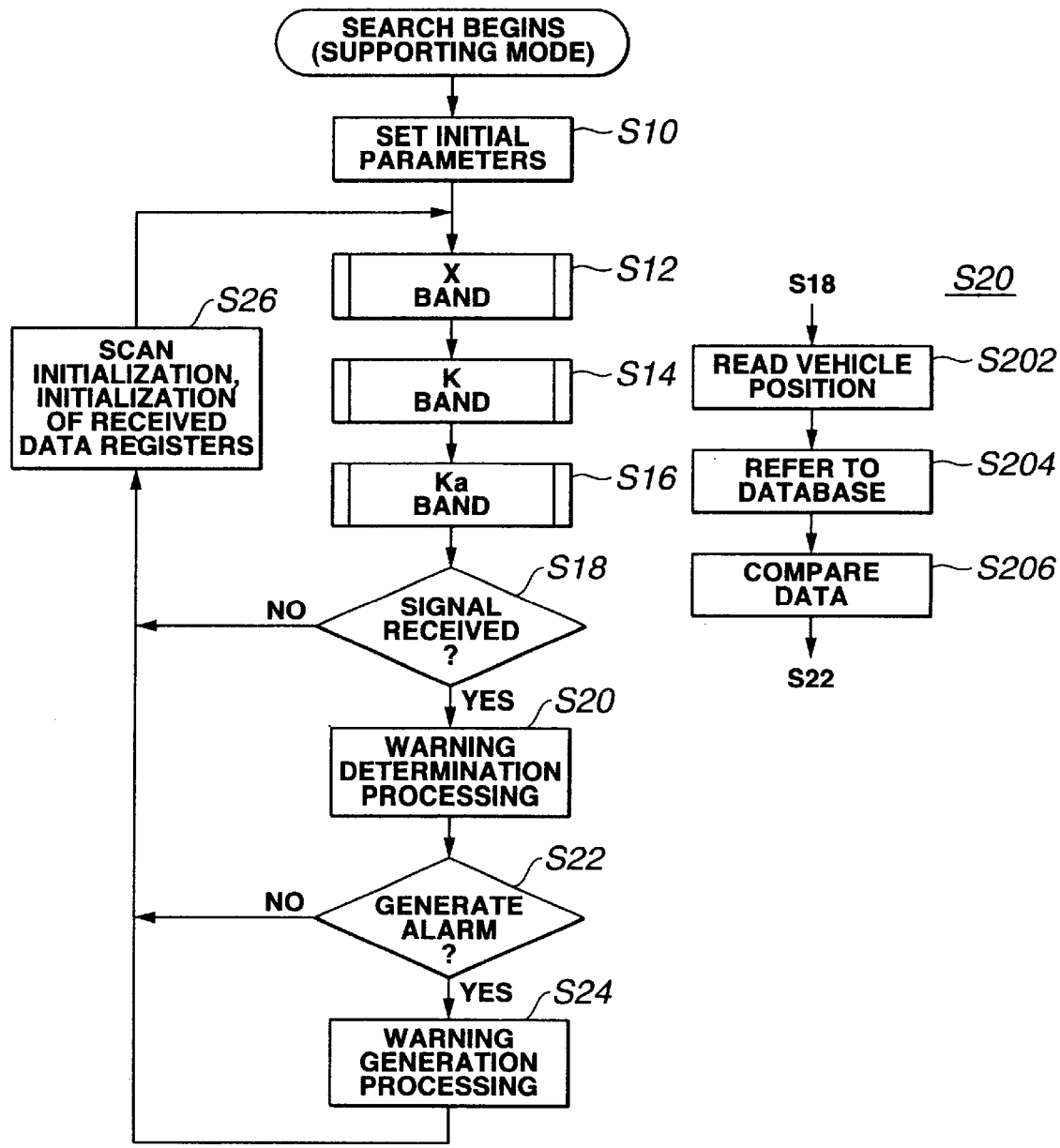
FIG. 10 is a flowchart for explaining the supporting mode (first embodiment) for referencing data on jamming waves present near the current travel location, distinguishing whether the received signal comprises jamming waves or speed sensing waves, and reducing false detection.

FIG. 10 is a flow chart for explaining the first embodiment of the supporting mode for detecting radar sensing waves while referring to the received data (jamming wave distribution map) accumulated in the database and avoiding the jamming waves. In FIG. 10, the same symbols are applied to portions corresponding to FIG. 2. This is an example of checking the detected electromagnetic wave signals with the jamming wave data for the travel location and determining whether the detected waves are sensing waves.

When a user operates the mode selection switch S5 and selects the supporting travel mode, the control portion 300 executes the routine shown in FIG. 10. The control portion 300 executes an initialization to set the required flag register, received data registers, and memory class to prescribed values (S10). The control portion 300 executes the search processing for radar sensing waves in the X band (S12), the search processing for radar sensing waves in the K band (S14), and the search processing for radar sensing waves in the Ka band (S16) in that order. A received data register (X register, K register, Ka register) is prepared for each band. When sensing waves are detected in a searched band, the sensing wave information is recorded in the register for that band.

Figure 11:
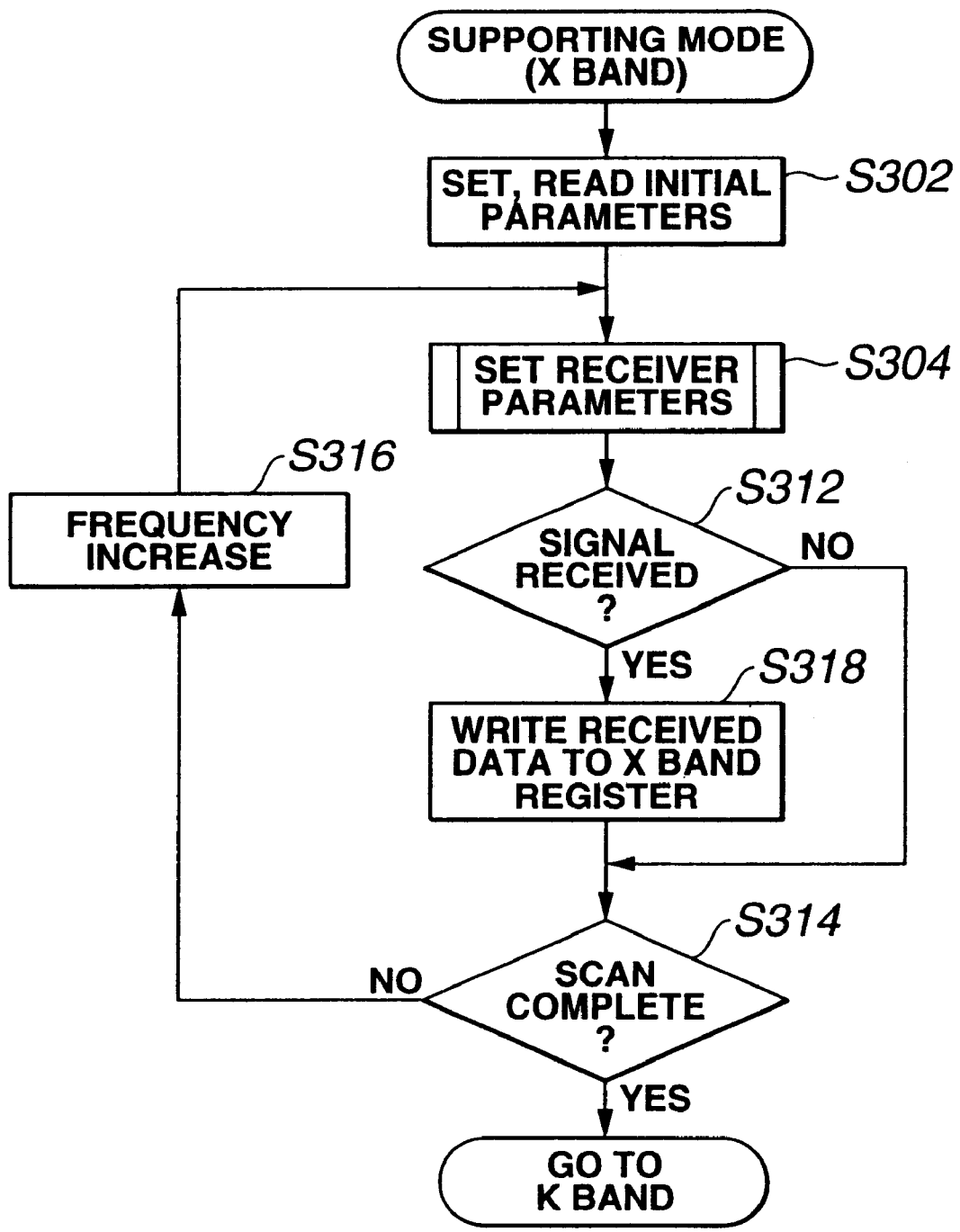
FIG. 11 is a flowchart for explaining an example of X band searching in the supporting mode (first embodiment)

FIG. 11 is a flowchart for explaining an example of the search processing in the X band (S12). As shown in this figure, the control portion 300 sets the initial parameters and searches the X band. The control portion 300 reads the data necessary to set the receiver for searching the X band from memory 302 (S302), and effects frequency setting for the VCO of the receiver 100 (S304). The control portion 300 monitors whether electromagnetic wave signals are detected in the received frequency set (S312). When a signal is present (S312: Yes), the control portion 300 writes data (information relating to the electromagnetic wave signal detected) such as the signal level, frequency, and reception time of the received signal to the X register wherein X band data are written (S318). After the writing of the data is complete or when a received signal is not present (S312: No), the control portion 300 distinguishes whether the X band search is complete (S314). When the search is not complete (S314: No), the control portion 300 increases the parameter values so as to increase the received frequency by the frequency resolution (S316). The control portion 300 updates the reception parameters with these parameters and increases the received frequency (S304). The control portion 300 repeats steps S304 to S312, S318, S314, and S316, searches the X band, and writes detected signals. When the X band search is complete (S314: Yes), the process moves on to the K band (S14) search. Searching is performed with reference to the database in the same way for the K band (S14) and Ka band (S16) as well.

When the search of each band is complete, the control portion 300 reads the X register, K register, and Ka register and determines whether signal information is written therein (S18). When information is written (S18: Yes), the control portion 300 reads the current vehicle position Pn from the output of the GPS receiver 200 (S202). The control portion 300 references the database and reads the presence of jamming waves at the current travel position Pn from the database in memory 302 (S204). The control portion 300 reads this jamming wave information, such as frequency, signal intensity, and time present, and information showing the properties of the speed detecting waves, and compares this information to information such as frequency, signal intensity, and time for the detected electromagnetic wave signals written to each register (S206). For example, the signal level of the jamming waves is used as the threshold value and then one condition for the determination can be whether the level of the electromagnetic wave signal exceeds this value. On the basis of the results of this comparison, the control portion 300 determines that speed sensing waves are detected and that a warning should be generated (S22). When the probability that detected electromagnetic wave signals are sensing waves is a specified values or greater (S22: Yes), the control portion 300 makes a signal or alarm with the speaker 303 and display 305. The signal, such as the generation of an alarm, continues for a specified time such as three seconds (S24).

After the generation of the abovementioned warning (S24), when reception of a signal is not written to each register (S18: No), or when it is determined to not generate a warning (S22: No), the control portion 300 initializes each register (S26) and repeats the search of the X band, K band, and Ka band (S12 to S16) and the warning processing (S18 to S24). Moreover, mode switching can be effected by interrupt processing, not shown.

Figure 12:
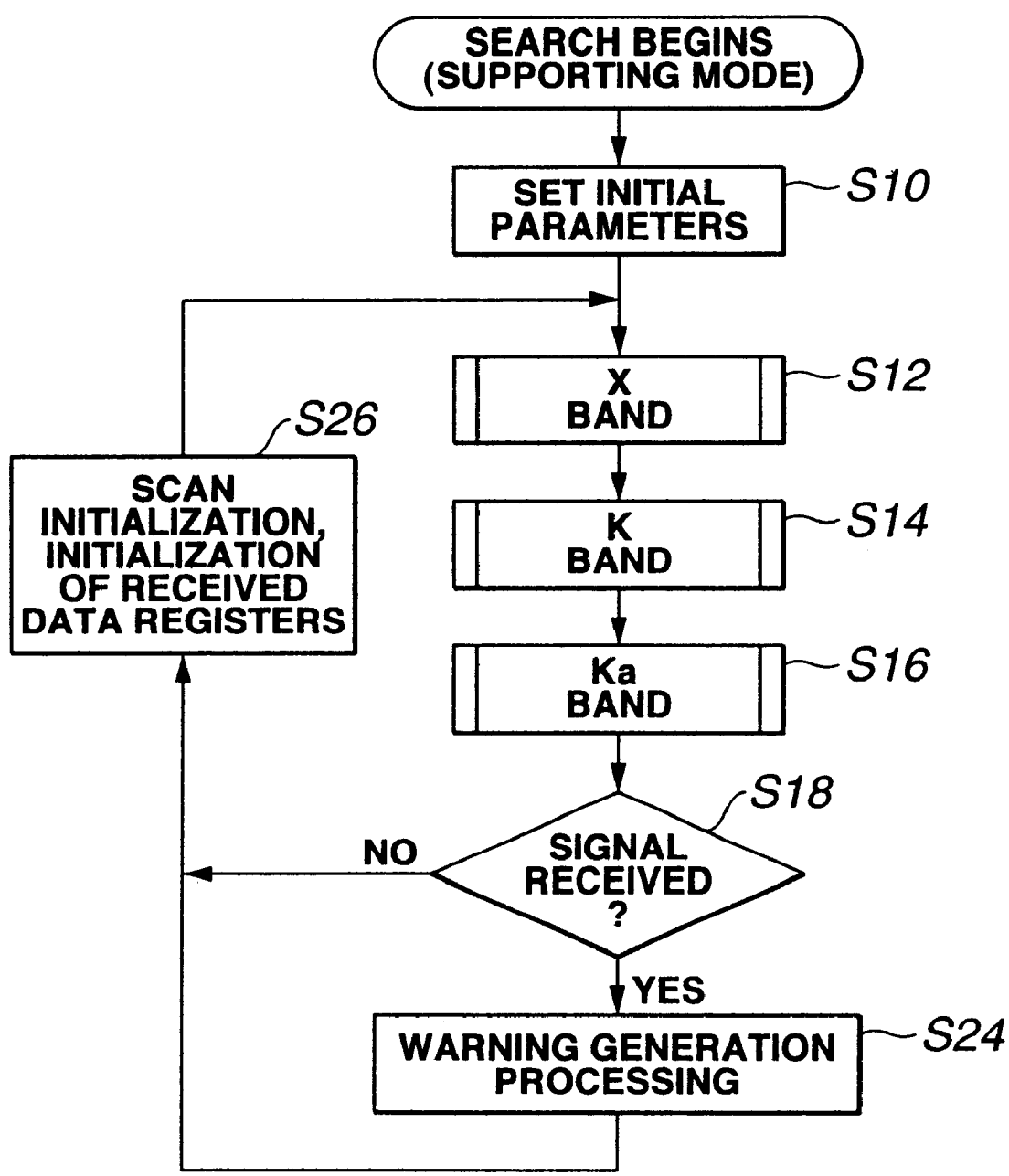
FIG. 12 is a flowchart for explaining the supporting mode (second embodiment) for referencing data on jamming waves present near the current travel location, adjusting the detection sensitivity of the receiver, and reducing false alarms.

FIG. 12 is a flow chart to explained the second embodiment of the supporting mode wherein the control portion 300 refers to the received data (jamming wave distribution map) accumulated in the database and avoids jamming waves while detecting radar sensing waves. In FIG. 12, the same symbols are used for portions corresponding to FIG. 2. In this example, false detections of sensing waves are reduced by setting the detection sensitivity of the receiver according to the jamming wave data for the travel location.

When the user operates the mode selection switch S5 and selects the supporting travel mode, the control portion 300 executes the routine shown in FIG. 12. The control portion 300 initializes the necessary flag register, each received data register, and memory class to prescribed values (S10). The control portion 300 executes the search processing for radar sensing waves in the X band (S12), the search processing for radar sensing waves in the K band (S14), and the search processing for radar sensing waves in the Ka band (S16) in that order. A received data register (X register, K register, Ka register) is prepared for each band. When sensing waves are detected in a searched band, the sensing wave information is recorded in the register for that band.

Figure 13:
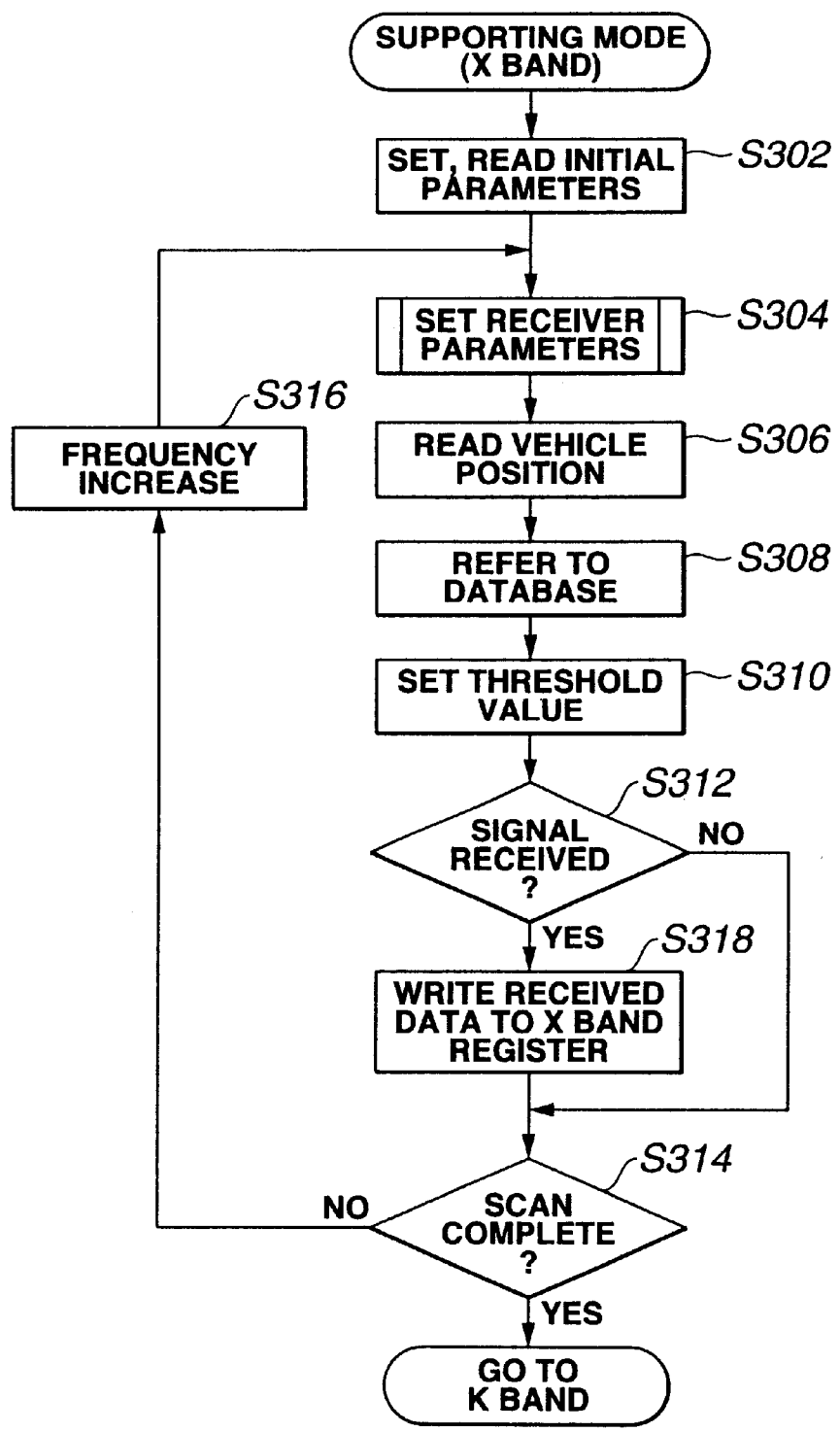
FIG. 13 is a flowchart for explaining an example of X band searching in the supporting mode (second embodiment)

FIG. 13 is a flowchart for explaining an example of the search processing in the X band (S12). As shown in the drawing, the control portion 300 sets the initial parameters and searches the X band. The control portion 300 reads the data necessary for setting the receiver in order to search the X band from memory 302 (S302) and establishes the VCO frequency of the receiver 100 (S304). The control portion 300 reads the current vehicle position Pn from the output of the GPS receiver 200 (S306). The control portion 300 refers to the database and reads the presence of jamming waves at the current travel position Pn from the database in memory 302 (S310). When jamming waves are present at the current position, the control portion 300 reads the received level from the data for the jamming waves and sets this level as the detection threshold (or detection sensitivity) of the receiver 100. It is convenient to set the distinguishing level (threshold) of the jamming waves to a value slightly greater than the level of the jamming waves, so that jamming waves are not falsely detected (S310). The control portion 300 monitors whether signals are detected from the receiver 100 (S312). In the case where a signal exceeding the threshold value is present (S312: Yes), the control portion 300 writes the detection of a sensing wave signal to the X register to which data for detected X band signals are written (S318). After data writing is complete or when a received signal is not present (S312: No), the control portion 300 distinguishes whether the X band search is compete (S314). When not complete (S314: No), the control portion 300 increases the parameter values so that the received frequency is increased by the frequency resolution (S316). The control portion 300 updates reception parameters with this parameter and increases the received frequency (S304). The control portion 300 repeats steps S304 to 312, S318, S314, S316, searches the X band, and writes information on detected signals. When the X band search is complete (S314: Yes), the process moves to the search of the K band (S14). The K band (S14) and Ka band (S16) are searched in the same way with reference to the database.

When the search of each band is complete, the control portion 300 reads the X register, K register, and Ka register and determines whether information pertaining to sensing wave signal detection is written therein (S18). When information is written (S18: Yes), the control portion 300 generates a signal or alarm with the speaker 303 and display 305. The generation of the signal, such as an alarm, continues for a prescribed period of time (S24). Moreover, it may also be determined to generate an alarm if signal information is written to each register.

After generation of the abovementioned alarm (S24) or when sensing wave signal detection is not written to each register (S18: No), the control portion 300 initializes each register (S26) and repeats the search of the X band, K band, and Ka band (S12 to S16) and the alarm processing (S18, S24). Moreover, mode switching is performed by interrupt processing, not shown.

In this way, the false detection of sensing wave signals on the basis of the database can be prevented by software processing (example 1) to compare detected signal data with jamming wave signal data, and by hardware control (example 2) for differentiating detected signals as jamming waves according to the determination of the threshold values.

Figure 14:
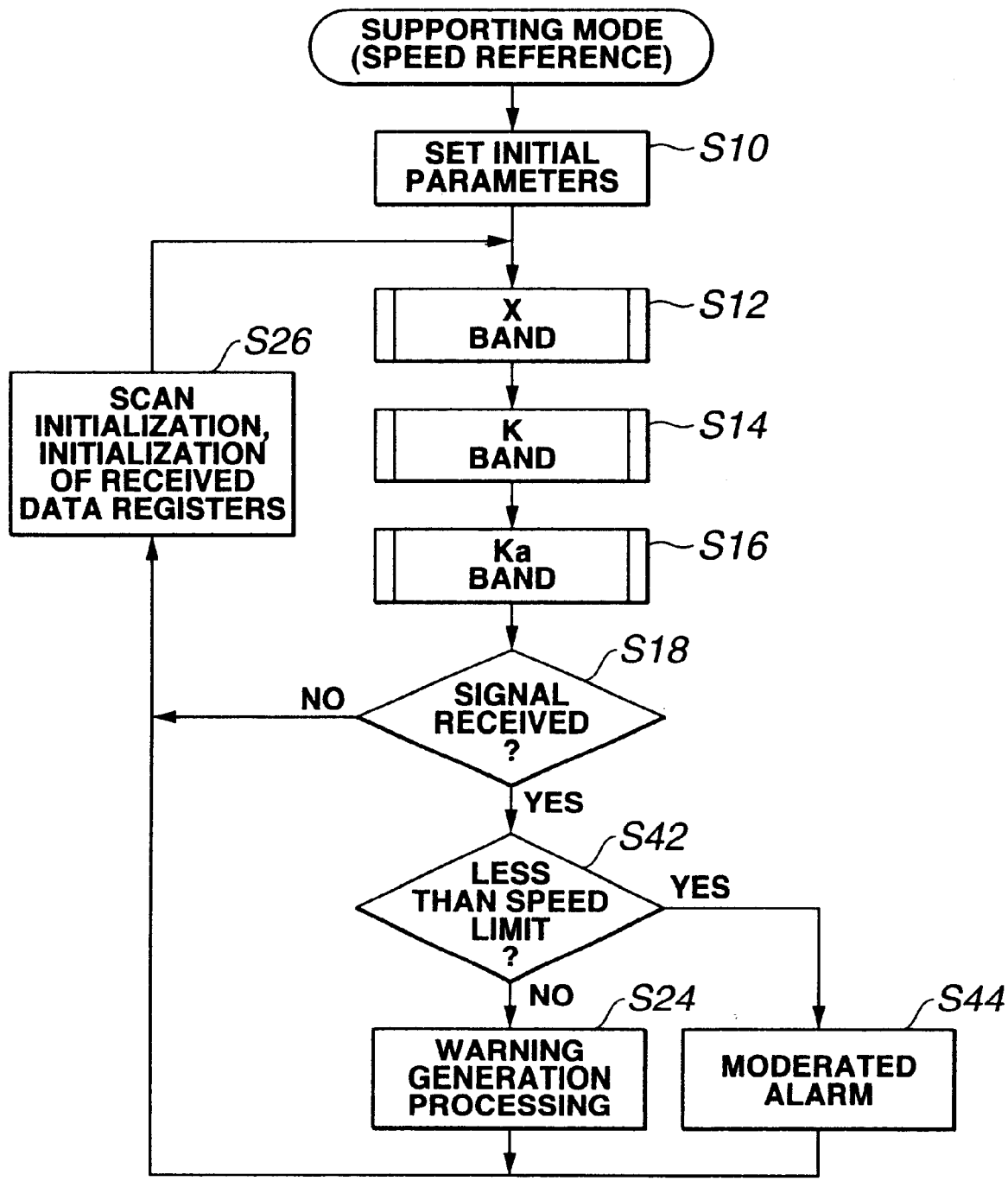
FIG. 14 is a flowchart for explaining the supporting mode (third embodiment) for referencing the current vehicle speed and the speed limit on the road being traveled and varying the manner of the warnings when sensing waves are detected.

FIG. 14 shows the third embodiment of the supporting mode and is furthermore a flowchart for explaining an example wherein vehicle speed is also referenced. In this drawing, the same symbols are used for portions corresponding to FIG. 10 or 12 and an explanation of those portions is omitted.

If the vehicle does not exceed the appropriate speed for the route being traveled, it is not considered to be necessary to generate an alarm. However, conventional radar receivers contain no mechanism for confirming the speed of the automobile and are thought to provide unnecessary stress to the driver because these devices generate an alarm if sensing waves are present.

In this example, therefore, upon determining that sensing waves are present (S18: Yes) as a result of the processing for preventing false detection (or threshold value control) as discussed above, the apparatus then determines whether the speed of the vehicle is at or below the speed limit. The speed of the vehicle is output from the GPS receiver 200. For example, the GPS receiver 200 finds the distance traveled between the current vehicle position and the previous vehicle position and finds the travel time from the difference between the current time and the previous time. The vehicle speed is calculated from the distance moved and movement time. The speed limit for the current travel location from the current vehicle position is read from the database. The control portion 300 determines whether vehicle speed exceeds the speed limit (S42). When the vehicle speed exceeds the speed limit (S42: No), the control portion 300 generates an alarm by voice, buzzer, or display on a display panel and strongly invokes the attention of the driver (S24). When the vehicle speed does not exceed the speed limit (S42: Yes), the control portion 300 invokes attention (moderated alarm) with a mild voice or display on a display panel. Also, it may be decided to not provide an alarm (or signal) (S24). Other processing is the same as in FIG. 10 or 12 and an explanation thereof is omitted.

The speed limit discussed above may be stored by manually adding the route speed to the comment column of sampled data shown in FIG. 7. Also, data relating to the route speed limit provided on a CD-ROM or online may be loaded into the database for use.

Figure 15:
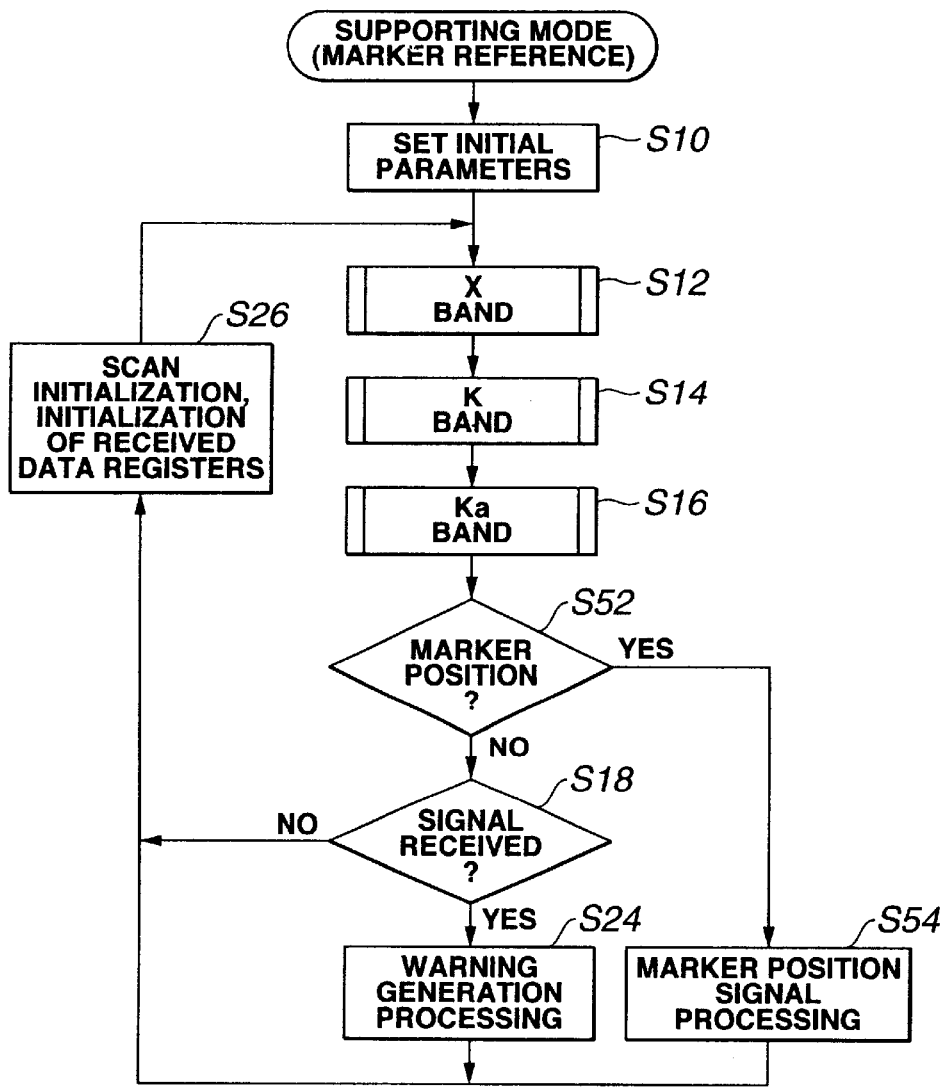
FIG. 15 is a flowchart for explaining the marker supporting mode (fourth embodiment) for generating warnings at marked locations.

FIG. 15 shows a fourth embodiment for outputting an alarm when the vehicle passes a marker location. In this drawing, the same symbols are used for portions corresponding to FIG. 10 or 12 and an explanation thereof is omitted.

Figure 16:
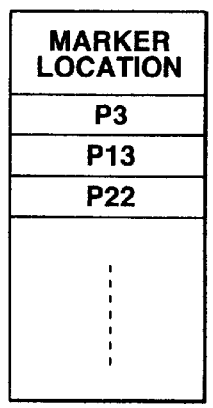
FIG. 16 is a drawing to explain the marker locations stored in memory.

The user operates a marker switch at a location at which the generation of an attention-getting sound is desired during travel. The marker switch may be substituted by operating any of switches S2 through S5 or a combination thereof (marker insert mode). Also, the location and marker command can be input manually. The control portion 300 correlates the position of the vehicle (or input location) at the time when the marker command is generated with the marker command and stores these in memory 302 (see FIG. 16). Moreover, this may also be operated by inputting the signal voice or text information to be displayed on the display device at the location at which the marker was set, or by selecting the signal from among a plurality of text information indicated and storing the signal to memory to be displayed (or signaled) at the pertinent location. For example, it is convenient to have displays (or signals) such as "check fuel" near a gas station, "check speed" near a speed sensor affixed to the roadway, and "reduce speed" near low speed areas.

Next, the marker reference supporting mode shown in FIG. 15 is effected by mode selection. The search processing of the speed sensing waves is effected (S10 to S18, S24, S26) in the same way as in the supporting modes in FIG. 12 or 14. However, when jamming wave information for the travel location is read from the database, a marker signal is also read when a marker signal is recorded at that location and is written to the marker register (S308).

After searching each band, the control portion 300 determines whether marker command signals are written to the marker register (S52). When signals are written (S52: Yes), the signal is voiced and displayed as in the first embodiment using the speaker 303 and display 305 (S54). The driver can thereby be informed that the vehicle is at or is approaching a marked location.

When marker command signals are not written to the marker register (S52), the control portion 300 next reads each register of received data and determines whether signal is detected (S18). In the case where a signal is detected (S18: Yes), an alarm in a different mode from the first embodiment is generated using the speaker 303 and display 305. It thereby becomes possible to distinguish alarms due to markers (S24). Moreover, marker detection and sensing wave detection may also be signaled in the same mode.

The search operation is repeated in the case where sensing waves are not detected (S18: No), or after the first and second warnings (signals) are made (S24, S54). Other operations are the same as the supporting mode shown in FIG. 10 or 12.

Moreover, the embodiments discussed above may be combined, making it possible to effect various operations such as detecting speed sensing waves while suppressing false operations, suppressing signals on the basis of the traveling speed of the automobile, and marker signaling; it also becomes possible to operate the apparatus with an arbitrary combination thereof.

In this manner, the embodiments of the present invention make it possible to distinguish the traveling location of an automobile; moreover, false operations due to jamming waves during the search operation can be reduced because of the appropriate updates (setting) to a reference for distinguishing speed sensing waves and jamming waves, according to a database of jamming wave information for the location.

Also, when the automobile is maintaining the speed limit for its present location, the present invention does not signal or provides a suppressed signal even if speed sensing waves are detected; as a result the driver is not disturbed.

Also, when the automobile passes a marked location with detecting a speed sensing wave, a buzzer or the like sounds to inform the driver the marked location. It is a convenience to the driver to inform the passage of the location where attention is required.

Moreover, in the embodiments, the user (driver) collects jamming wave data with the learning mode. But it is also possible to collect jamming wave data for each region in advance and provide it on an information storage medium such as a CD-ROM, IC card, or floppy disk, or an online medium such as the public telecommunications lines or the Internet.

Also, the GPS receiver may be a GPS receiver combined with a so-called car navigation system.

It is also possible for a dealer to sell the radar receiving apparatus with learning data for the dealer's region copied into memory 302, so that the apparatus can be immediately used in the supporting mode.

The embodiments discussed above were explained using an example of radio waves as the sensing waves, but the sensing waves may also be electromagnetic waves such as laser beams or infrared rays. Sound waves may also be used.

As explained above, it becomes possible to reduce false detection of radar sensing waves because the radar receiving apparatus relating to the present invention suppresses (or controls) the detection sensitivity according to individual jamming wave levels when a vehicle (receiving apparatus) passes near a jamming wave source, the presence of which has been confirmed in advance.

What is claimed is:

1. A vehicle mounted radar detecting apparatus that captures sensing waves emitted by speed sensors, comprising:
   a wireless receiving portion for searching frequency bands wherein said sensing waves are present, and for generating signal information relating to electromagnetic wave signals when electromagnetic wave signals corresponding to prescribed conditions are detected;
   a travel position detecting portion that detects the current position of said vehicle and outputs the position information;
   a first storage means for storing data; and
   a control portion for correlating said signal information generated by said wireless receiving portion with said position information of the vehicle, and storing said correlated information in said first storage means;
   wherein said correlated information is stored in a contour map of the distribution of electromagnetic wave signals.

2. The radar detecting apparatus according to claim 1, wherein said travel position detecting portion comprises a GPS receiving apparatus and outputs at least the latitude and longitude as said position information of the vehicle.

3. The radar detecting apparatus according to claim 1, herein said signal information includes at least either the frequency or the intensity of the detected electromagnetic signal.

4. The radar detecting apparatus according to claim 1, wherein said control portion refers to the data on the plurality of signal information and position information collected in said first storage means, forms a map of the distribution of the electromagnetic wave signals of the area through which said vehicle has traveled, and stores this in non-volatile second storage means.

5. The radar detecting apparatus according to claim 4, wherein said map of the distribution of the electromagnetic wave signals displays the area wherein said electromagnetic wave signals are present as a contour group that can be distinguished by the intensity and frequency of the signals.

6. The radar detecting apparatus according to claim 5, wherein said second storage means store said contour group according to the central position of the area shown by the contour group and the distance from the central position to the contour line.

7. A radar detecting apparatus mounted on a vehicle and that captures sensing waves emitted by speed sensors, comprising:
   a wireless receiving portion for searching frequency bands wherein said sensing waves are present, and for generating signal information relating to electromagnetic wave signals when electromagnetic wave signals corresponding to prescribed conditions are detected;
   a storage portion wherein the positions of jamming waves causing false detection by said wireless receiving portion and jamming wave information relating to the jamming waves are stored in advance, wherein said jamming wave information is stored in a contour map of the distribution of electromagnetic wave signals;
   alarm means for generating alarms; and
   a control portion for comparing signal information of said detected electromagnetic wave signals with jamming wave information corresponding to the present position of the vehicle read from said storage portion on the basis of the position information for said vehicle, and controlling said alarm means on the basis of the results.

8. The radar detecting apparatus according to claim 7 further comprising storage means wherein speed limits along the route traveled by said vehicle are stored in advance;
   wherein said control portion further calculates the vehicle speed from the change in said position information and the time difference and suppresses the output of said detection signal when the vehicle speed does not exceed said speed limit of the current position.

9. A radar detecting apparatus mounted on a vehicle and that captures sensing waves emitted by speed sensors, comprising:
- a wireless receiving portion for searching frequency bands wherein said sensing waves are present, and for generating signal information relating to electromagnetic wave signals when electromagnetic wave signals corresponding to prescribed conditions are detected;
- a travel position detecting portion that detects the current position of said vehicle and outputs the position information;
- a storage portion wherein the positions of jamming waves causing false detection by said wireless receiving portion and jamming wave information relating to the jamming waves are stored in advance, wherein said jamming wave information is stored in a contour map of the distribution of electromagnetic wave signals;
- alarm means for generating alarms on the basis of the generation of said detection signal; and
- a control portion for reading information relating to jamming waves at the current position from said storage portion on the basis of the position information of said vehicle and setting a detection reference for said wireless receiving portion.

10. The radar detecting apparatus according to claim 9 further comprising storage means wherein speed limits along the route traveled by said vehicle are stored in advance; wherein said control portion further calculates the vehicle speed from the change in said position information and the time difference and suppresses the output of said detection signal when the vehicle speed does not exceed said speed limit of the current position.

11. The radar detecting apparatus according to claim 1, wherein said position information includes the latitude, longitude and time.

12. The radar detecting apparatus according to claim 7, wherein said position information includes the latitude, longitude and time.

13. The radar detecting apparatus according to claim 1, wherein said electromagnetic wave signals include radio waves and laser beams.

14. The radar detecting apparatus according to claim 1, wherein said electromagnetic wave signals include radio waves and laser beams.

15. Information storage medium wherein the distribution of electromagnetic wave signals in an area traveled by a vehicle are stored, said electromagnetic wave signals including jamming wave information stored in a contour map of the distribution of electromagnetic wave signals.

16. Information storage medium wherein positions of jamming waves causing false detection by the radar detecting apparatus and information relating to the jamming waves are recorded as a map of the distribution of electromagnetic wave signals.

* * * * *